United States Patent
Kitamura et al.

(10) Patent No.: US 7,862,691 B2
(45) Date of Patent: Jan. 4, 2011

(54) DECOMPOSITION METHOD OF WASTE PLASTICS AND ORGANICS

(75) Inventors: Tatsuo Kitamura, Kusatsu (JP); Yoshihide Kitamura, Kusatsu (JP); Itsushi Kashimoto, Kusatsu (JP)

(73) Assignee: Kusatsu Electric Co., Ltd., Shiga (JP)

( * ) Notice: Subject to any disclaimer, the term of this patent is extended or adjusted under 35 U.S.C. 154(b) by 773 days.

(21) Appl. No.: 11/689,964

(22) Filed: Mar. 22, 2007

(65) Prior Publication Data

US 2008/0099323 A1    May 1, 2008

(30) Foreign Application Priority Data

Oct. 31, 2006   (JP) .............................. 2006-297194

(51) Int. Cl.
C10B 57/04   (2006.01)
(52) U.S. Cl. .............................. 201/25; 201/12; 201/10; 585/241; 588/316; 588/318

(58) Field of Classification Search ................. 588/316, 588/318, 321; 201/10, 12, 25; 423/481; 585/241
See application file for complete search history.

(56) References Cited

U.S. PATENT DOCUMENTS

| | | | | |
|---|---|---|---|---|
| 5,387,734 A * | 2/1995 | Hagenmaier et al. | ......... | 588/316 |
| 5,608,136 A * | 3/1997 | Maezawa et al. | ............ | 588/316 |
| 6,090,736 A * | 7/2000 | Taoda et al. | .................... | 502/5 |
| 6,383,980 B1* | 5/2002 | Hagihara et al. | ............ | 502/340 |
| 6,498,000 B2* | 12/2002 | Murasawa et al. | .......... | 430/531 |
| 7,034,198 B2* | 4/2006 | Osada et al. | .................. | 588/19 |
| 2007/0249887 A1 | 10/2007 | Kitamura et al. | | |

FOREIGN PATENT DOCUMENTS

| | | |
|---|---|---|
| JP | 2002-363337 | 12/2002 |
| JP | 2003-334529 | 11/2003 |
| JP | 2005-139440 | 6/2005 |

* cited by examiner

*Primary Examiner*—N. Bhat
(74) *Attorney, Agent, or Firm*—Kilyk & Bowersox, P.L.L.C.

(57) ABSTRACT

A method of decomposing waste plastics, organics, and particularly medical waste composed of a varieties of plastics is described.

7 Claims, 9 Drawing Sheets

COMPARISON OF SLAKED LIME AND QUICKLIME AND
INFLUENCES OF WATER CONTENT

UNIT(ppm)

| TEMPERATURE | WATER CONTENT 10% | | WATER CONTENT 20% | |
|---|---|---|---|---|
| (°C) | SLAKED LIME | QUICKLIME | SLAKED LIME | QUICKLIME |
| 527 | — | 26.8225 | 37.9328 | 46.4580 |
| 427 | 2.3308 | 2.6455 | 3.7412 | 4.5821 |
| 327 | 0.4603 | 0.1199 | 0.1696 | 0.2078 |
| 227 | 0.0488 | 0.0016 | 0.0022 | 0.0027 |
| 127 | 0.0018 | 0.0000 | 0.0000 | 0.0000 |
| 27 | 0.0000 | 0.0000 | 0.0000 | 0.0000 |

■FLOW OF TREATMENT

Fig.7

EXPERIMENTAL DATA OF DECOMPOSITION EFFICIENCIES
AT EACH TEMPERATURE OF TITANIUM OXIDE

EXPERIMENTAL CONDITIONS
- EXPERIMENTAL MACHINE ··· AGITATION TYPE EXPERIMENTAL MACHINE
- AMOUNT OF CATALYST ··· 700g OF TITANIUM OXIDE
- FEEDING AMOUNT ··· 1g / feed OF POLYETHYLENE PELLETS
- AMOUNT OF AIR SUPPLY ··· 50 l / min
- ROTATION SPEED OF AGITATION BLADES ··· 35 rpm

| FIRST TEMPERATURE OF TITANIUM OXIDE | °C | 300 | 320 | 350 | 380 | 400 | 420 | 450 | 480 | 500 | 530 | 550 | 560 | 570 | 580 | 600 |
|---|---|---|---|---|---|---|---|---|---|---|---|---|---|---|---|---|
| VARIATION OF TEMPERATURE | °C | ~300 | ~324 | ~350 | ~394 | ~413 | ~435 | ~469 | ~506 | ~520 | ~546 | ~563 | ~571 | ~586 | ~588 | ~612 |
| PERIOD OF TIME UNTIL TITANIUM OXIDE IS RETURNED TO WHITE | | — | — | 35min. to 45min. | 25min. to 25min. | 6min. to 6min. | 3min. to 5min. | 1min. 30 sec. to 2 min. | 30sec. to 40sec. | 30sec. | 15sec. | 20sec. | 20sec. | IGNITED AND BURN OUT | IGNITED AND BURN OUT | IGNITED AND BURN OUT |
| INSTANTANEOUS VALUES OF GAS INGREDIENTS | | | | | | | | | | | | | | | | |
| NOx | ppm | 0.00 | 0.00 | 0.06 | 0.07 | 0.20 | 0.28 | 0.31 | 0.43 | 0.55 | 0.59 | 0.90 | 0.63 | 1.17 | 0.96 | 1.26 |
| CO | ppm | 0.00 | 0.00 | 0.90 | 0.80 | 1.20 | 1.90 | 1.40 | 1.50 | 0.90 | 0.80 | 0.70 | 0.10 | 1.50 | 1.40 | 61.10 |
| CO$_2$ | vol% | 0.00 | 0.11 | 0.33 | 0.54 | 0.67 | 0.96 | 1.33 | 1.90 | 1.77 | 1.87 | 2.01 | 2.01 | 2.06 | 3.00 | 2.64 |
| O$_2$ | vol% | 21.20 | 20.83 | 20.35 | 19.90 | 19.70 | 19.55 | 18.01 | 18.30 | 18.50 | 18.52 | 16.80 | 17.96 | 17.85 | 17.10 | 17.36 |
| CH$_4$ | ppm | 0.00 | 1.20 | 2.50 | 2.70 | 3.00 | 3.10 | 3.30 | 4.00 | 3.00 | 9.10 | 6.20 | 9.17 | 11.70 | 28.10 | 34.80 |

Fig.8

RESULTS OF MEASUREMENT OF DIOXIN

| NAME OF MATERIAL TO BE MEASURED | WASTE PLASTIC CONTAINING 20% OF POLYVINYLCHLORIDE | | |
|---|---|---|---|
| ITEMS TO BE MEASURED | EXHAUST GAS | CATALYST IN DECOMPOSITION TANK | NEUTRALIZING AGENT IN NEUTRALIZATION APPARATUS |
| CONCENTRATION OF DIOXIN AND COPLANAR PCB — MESURED VALUE | 2.4ng/Nm$^3$ | 0.0016ng/Nm$^3$ | 0.0037ng/Nm$^3$ |
| CONCENTRATION OF DIOXIN AND COPLANAR PCB — TOXIC EQUIVALENT | 0.0066ng-TEQ/Nm$^3$ | 0.00000016ng-TEQ/Nm$^3$ | 0ng-TEQ/Nm$^3$ |

Fig.9

| MATERIALS TO BE FED | | PE | | | PS | | | PVC | | |
|---|---|---|---|---|---|---|---|---|---|---|
| POSITION OF COLLECTION | | AFTER TITANIUM | AFTER LIME | AFTER PLATINUM | AFTER TITANIUM | AFTER LIME | AFTER PLATINUM | AFTER TITANIUM | AFTER LIME | AFTER PLATINUM |
| N$_2$ | % | — | — | — | — | — | — | — | — | — |
| NO | ppm | — | — | — | — | — | — | — | — | — |
| NO$_2$ | ppm | — | — | — | — | — | — | — | — | — |
| HCN | ppm | — | — | — | — | — | — | — | — | — |
| HCL | ppm | — | — | — | — | — | — | 2600 | 5.3 | 6.8 |
| CL$_2$ | ppm | — | — | — | — | — | — | <0.05 | <0.05 | 0.09 |
| HF | ppm | — | — | — | — | — | — | — | — | — |

| MATERIALS TO BE FED | | PU | | | TEFLON | | | MEASUREMENT METHOD |
|---|---|---|---|---|---|---|---|---|
| POSITION OF COLLECTION | | AFTER TITANIUM | AFTER LIME | AFTER PLATINUM | AFTER TITANIUM | AFTER LIME | AFTER PLATINUM | |
| N$_2$ | % | 81 | 82 | 79 | — | — | — | GC-TCD |
| NO | ppm | 23 | 11 | 230 | — | — | — | CONTINUOUS METER |
| NO$_2$ | ppm | <1 | <1 | 95 | — | — | — | CONTINUOUS METER |
| HCN | ppm | 17 | 6.6 | 0.4 | — | — | — | JIS K0109.7.1 |
| HCL | ppm | — | — | — | — | — | — | JIS K0107.7.1 |
| CL$_2$ | ppm | — | — | — | — | — | — | JIS K0106.63 |
| HF | ppm | — | — | — | 4100 | 2.6 | 41 | JIS K0105.6.1 |

Fig.10

| DETERMINATION MACHINE | | | | 24 HOURS | 48 HOURS |
|---|---|---|---|---|---|
| TITANIUM WASHING WATER | 2006.9.25 | SCD 9cm | | | |
| 50g/35ml PBS sol | | PCA | PETAN CHECK | 0 | 7 OTHER THAN ADDED PORTION |
| 10mcl ADDITION | | DESO | PETAN CHECK | 0 | 0 |
| | | ESCM | PETAN CHECK | 0 | 0 |
| | | MSEY | PETAN CHECK | 0 | 0 |
| | | SCD | PETAN CHECK | 0 | 0 |

| AGITATION TYPE EXPERIMENTAL MACHINE | | | | | |
|---|---|---|---|---|---|
| TITANIUM WASHING WATER | 2006.6.21 | SCD 9cm | | | |
| 265g/200ml H2O | | PCA | PETAN CHECK | 0 | 0 |
| 10mcl ADDITION | | DESO | PETAN CHECK | 0 | 0 |
| | | ESCM | PETAN CHECK | 0 | 0 |
| | | MSEY | PETAN CHECK | 0 | 0 |
| | | SCD | PETAN CHECK | 0 | 0 |

DECOMPOSITION METHOD OF WASTE PLASTICS AND ORGANICS

BACKGROUND OF THE INVENTION

1. Field of the Invention

The present invention relates to a decomposition method of waste plastics, organics, and particularly medical waste composed of various plastics and organics and infectious medical waste, more specifically to a high efficient decomposition method of waste plastics and organics by optimizing respective conditions of decomposition method of waste plastics and organics.

This application claims the priority of Japanese Patent Application No. 2006-297194.

2. Related Background of the Invention

Recently, there have been proposed various methods of treating and recycling waste plastics, and a part thereof are practically employed. As a useful method of recycling and reusing such waste plastics, there is proposed a method and apparatus for gasifying the waste plastics by heating chips of the waste plastics in the presence of a decomposition catalyst of titanium oxide known as a photocatalyst under irradiation of ultraviolet light (Referring to Patent Documents 1, 2).

Further, catalysts used for decomposition treatment of the waste plastics chips have been variously studied (Patent Documents 3 to 5).

The decomposition apparatus using the above decomposition method of waste plastics, however, cannot conduct efficient decomposition treatment of waste plastics, and requires large treatment cost and large apparatus.

Furthermore, the treatment of waste containing polyvinylchloride is known to generate hydrogen chloride gas. Also, the treatment of Teflon is known to generate toxic hydrogen fluoride gas. The treatment of those kinds of gases becomes a problem.

Regarding the prevention of secondary infection caused by infectious medical waste discharged from hospitals, dialysis facilities, and the like, a guideline specifying the treatment method of that kind of waste was issued from the Ministry of Health and Welfare on Nov. 7, 1989, and was enforced on Apr. 1, 1990. The guideline orders the hospitals, dialysis facilities, and the like to conduct in-house or on-site sterilization of the medical waste, in principle.

In this regard, there is wanted the development of a decomposition method for waste plastics, in particular the infectious medical waste containing polyvinylchloride, applicable in hospitals or clinics safely without using large scale apparatus.

[Patent Document 1] Japanese Patent Application Laid-Open No. 2002-363337
[Patent Document 2] Japanese Patent Application Laid-Open No. 2004-182837
[Patent Document 3] Japanese Patent Application Laid-Open No. 2005-066433
[Patent Document 4] Japanese Patent Application Laid-Open No. 2005-205312
[Patent Document 5] Japanese Patent Application Laid-Open No. 2005-307007

SUMMARY OF THE INVENTION

Problems to be Solved by the Invention

In order to satisfy the above requirements, an object of the present invention is to provide a method of efficiently decomposing waste plastics and organics, particularly medical waste composed of varieties of plastics, biological substances such as blood, and plastics with adhered biological substances. Further, another object is to provide a decomposition method which can remove HCl generated during decomposition of chlorine-based plastics such as polyvinylchloride, sulfur compounds and nitrogen compounds generated during decomposition of biological waste and varieties of medical waste plastics; hydrogen fluoride generated during decomposition of fluorine compounds such as Teflon, and the like.

Means for Solving the Problems

As a result of the intensive study to achieve the aforementioned objects, the present inventors established a method of efficiently decomposing waste plastics, organics, and particularly medical waste mainly composed of varieties of plastics by optimizing conditions in a decomposition process and introducing a process of adsorbing and removing generated harmful gases, and have completed the present invention.

Namely, the present invention is as follows:

"1. A decomposition method of waste plastics and organics by gasifying the waste plastics and/or organics, the method comprising the process of heating and agitating the waste plastics and/or organics together with a catalyst composed of titanium oxide granules in which the active ingredient is titanium oxide, wherein the heating temperature of the catalyst is within the range of 420° C. to 560° C.

2. The decomposition method according to preceding clause 1, wherein the titanium oxide granules have the following characteristics:
(1) the specific surface area from 35 to 50 $m^2/g$; and
(2) the granule size of 3.5 mesh (5.60 mm) or smaller.

3. The decomposition method according to preceding clause 1 or 2, wherein a treatment amount of the waste plastics per hour with respect to 100 kg of the titanium oxide granules is 3.0 to 40.0 kg.

4. The decomposition method according to any one of preceding clauses 1 to 3, further comprising a lime neutralization treatment process.

5. The decomposition method according to any one of preceding clauses 1 to 4, further comprising an oxidation catalyst treatment process.

6. The decomposition method according to preceding clause 5, further comprising an alumina catalyst treatment process before the oxidation catalyst treatment process.

7. The decomposition method according to any one of preceding clauses 1 to 6, further comprising the process of separation of metals and/or inorganics."

EFFECTS OF THE INVENTION

According to a decomposition method of the present invention, there can be treated efficiently waste plastics, organics, and particularly medical waste composed of varieties of plastics, biological substances such as blood, and plastics with adhered biological substances. Further, there can be easily treated plastics which generate HCl, hydrogen fluoride, sulfur compounds, nitrogen compounds, and the like during decomposition process, organics, biological substances such as blood, and fluorine compounds generating hydrogen fluoride.

BRIEF DESCRIPTION OF THE DRAWINGS

FIG. 7 shows the results of decomposition of waste plastics at various temperatures.

FIG. 8 shows detection of dioxin generated in the processes of decomposition method according to the present invention.

FIG. 9 shows the results of measurement of gases generated by decomposition of various waste plastics.

FIG. 10 shows the results of a check of adhered fungus to the titanium oxide granules after decomposition treatment.

EXPLANATION OF REFERENCE NUMERALS

Figure 1:
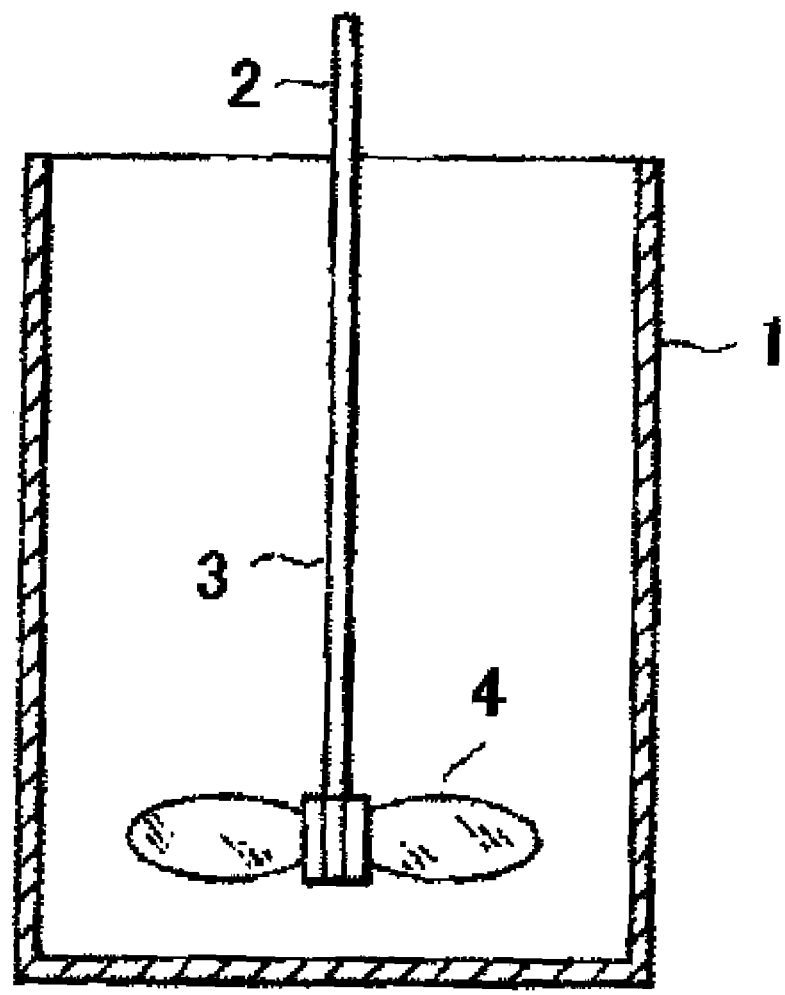
FIG. 1 illustrates an apparatus for determining an abrasion rate of titanium oxide.

1 Sample Vessel
2 agitator
3 shaft body
4 agitation blade

DESCRIPTION OF THE PREFERRED EMBODIMENTS

The "heating temperature of the catalyst" according to the present invention needs at least 300° C. or above and 600° C. or below, preferably 350° C. or above, more preferably from 420° C. to 560° C., still preferably from 450° C. to 530° C., and most preferably about 480° C.

The heating temperature is the catalyst temperature in the reactor to bring the catalyst and the waste plastics and/or organics into reaction condition, and is the set temperature to keep the set temperature of catalyst. That is, even when the set temperature is 480° C., the range of fluctuation of the catalyst temperature in the reactor becomes about ±30° C. from the set temperature.

In the examples, the heating temperatures of the catalyst have been variously studied. As a result, the optimum heating temperature for waste plastics decomposition has been set.

The catalyst of the present invention is preferably the one made by titanium oxide granules containing titanium oxide as the active ingredient. The catalyst composed of titanium oxide granules is not only the titanium oxide granules made only of titanium oxide as the active ingredient, but also includes granules of a mixture of titanium oxide with at least one of aluminum oxide and silicon oxide, (hereinafter also referred to as the "titanium oxide mixture"). As already known, since the titanium oxide has a function of photocatalyst, the decomposition of waste plastics and organics using any of above catalysts may be conducted, as needed, by irradiating light, specifically irradiating ultraviolet light, while heating and agitating the catalyst and the waste plastics and organics. However, for the case of decomposition of single article of varieties of waste plastics and organics, or decomposition of varieties of materials containing their solid, liquid, or containing metals or inorganics, the irradiation of ultraviolet light achieves little effect in terms of practical application.

To this point, the decomposition system for waste plastics and organics according to the present invention allows the decomposition of waste plastics and organics at high efficiency without applying light irradiation by the use of a suitable decomposition apparatus, by the optimization of decomposition condition, and by the use of suitable catalyst.

The titanium oxide granules are manufactured by drying a sol of titanium oxide to a gel of titanium oxide, firing the gel in a temperature range from 450° C. to 850° C., and then crushing and edge-treating the fired product. The granules of a mixture of titanium oxide are manufactured by mixing and drying the sol of titanium oxide and at least one sol of alumina sol and silica sol to prepare a gel, firing the gel in a temperature range from 450° C. to 850° C., and then crushing and edge-treating the fired product. The used titanium oxide is preferably an anatase-type titanium oxide.

The shape of the titanium oxide granules used in the decomposition method for waste plastics and organics according to the present invention is 3.5 mesh (5.60 mm) or smaller, and preferably 10 mesh (1.70 mm) or smaller.

More preferably, the shape of the titanium oxide granules before use is from 5.60 mm to 110 μm, or from 3.50 mm to 150 μm.

Figure 12:
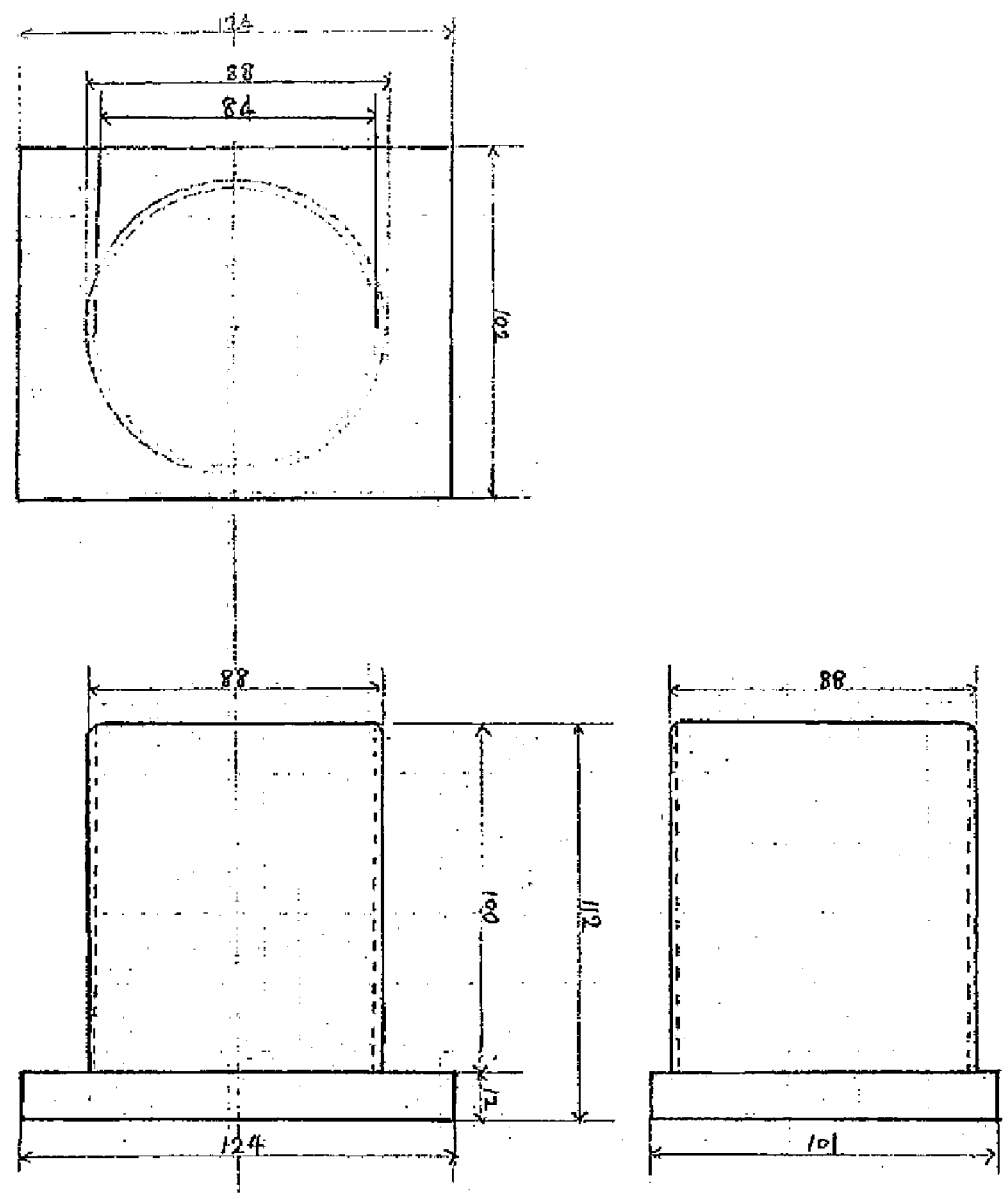
FIG. 12 shows a part of compression mold lower-presser (measure: mm).
Figure 13:
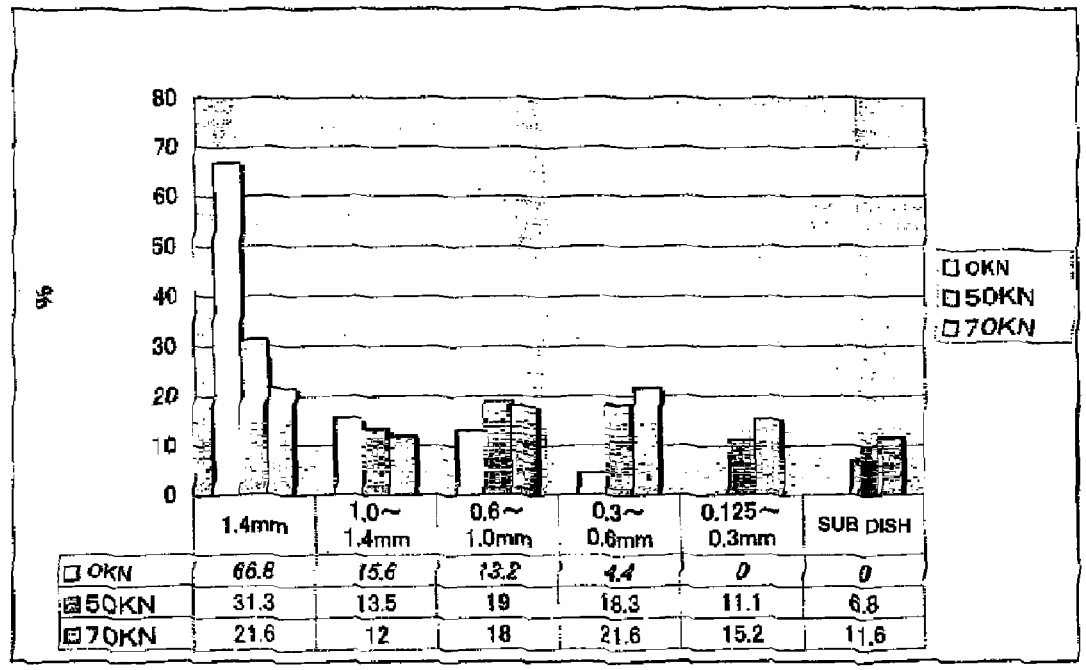
FIG. 13 shows intensity distribution of catalyst (without edge-treating).
Figure 14:
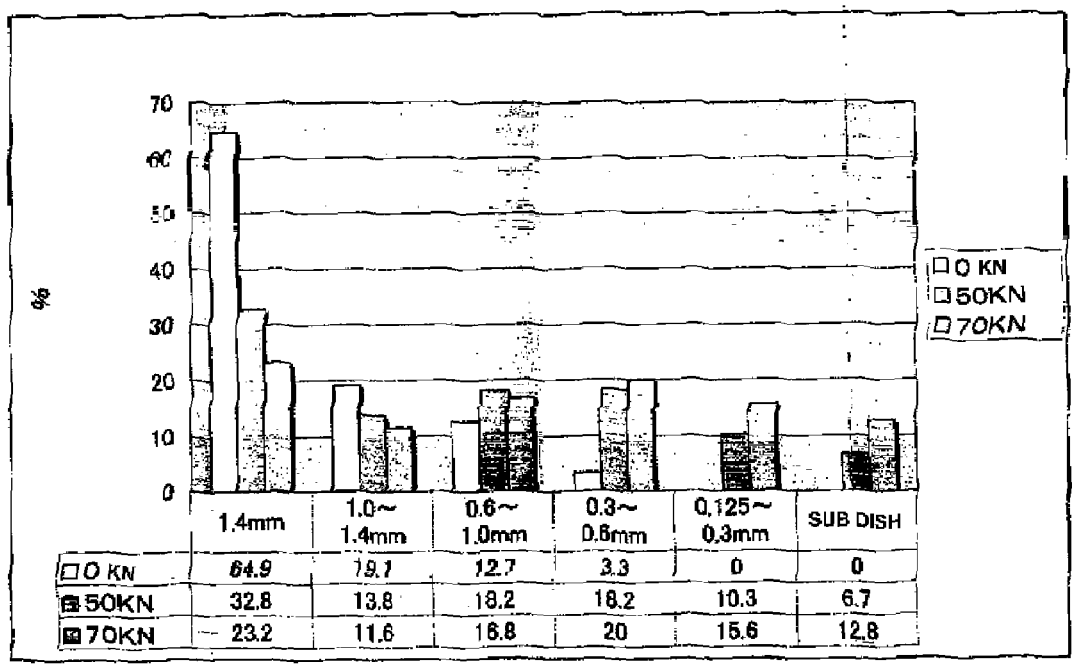
FIG. 14 shows intensity distribution of catalyst (with edge-treating).

In detail, a percentage of the titanium oxide granules having shape of 0.1 mm or above is preferably 90% or above (referring to FIGS. 12 and 13 and 14).

A preferred shape of the titanium oxide granules or the granules of mixture of titanium oxide in the conventional decomposition method for waste plastics is the one having a particle size distribution in which the percentage of particles having 0.5 to 1.18 mm in size is 50 to 95% by weight, and the percentage of particles having 1.18 to 1.7 mm in size is 5 to 50% by weight, and having 2.0% or less of abrasion rate; and more preferably the one having a particle size distribution in which the percentage of particles having 0.5 to 1.18 mm in size is 60 to 90% by weight, and the percentage of particles having 1.18 to 1.7 mm in size is 10 to 40% by weight, and having 1.0% or less of abrasion rate.

However, the applicable shape of the titanium oxide granules used in the decomposition method for waste plastics and organics according to the present invention is widened to a broad range beyond the limitation of shape and particle size of the titanium oxide granules which were accepted in the above conventional method owing to the optimization of the conditions in the decomposition process. As a result, the titanium oxide granules having sizes not applicable in the conventional method can be used, and the simplification of process and manufacturing method of manufacturing titanium oxide is attained.

However, naturally the above conventional granules are sufficiently applicable for decomposing the waste plastics and organics.

As described above, the "catalyst composed of titanium oxide granules" according to the present invention is the titanium oxide granules or granules of a mixture of titanium oxide, have shapes of 3.5 mesh (5.60 mm) or smaller, preferably 10 mesh (1.70 mm) or smaller, and have 2.0% or less, preferably 1.0% or less, of abrasion rate after edge-treatment. As a result, the present invention allows waste plastics and organics to be decomposed at high efficiency over a long period of time by using the above-described catalyst.

The method to manufacture the granules having above shape is not specifically limited. For example, as described above, the granules having the above shape may be prepared by firing gel, crushing the fired product, and edge-treating the crushed product, followed by classifying (using sieves having the respective mesh sizes), or after edge-treatment, classifying to mix to an adequate sizes, thus obtaining the granules having above shape.

Among the titanium oxides prepared by varieties of methods, the titanium oxide prepared by drying a sol of titanium oxide to a gel of titanium oxide, which gel is then fired at temperatures in a range from 450° C. to 850° C., as described above, provides excellent performance as the decomposition catalyst for waste plastics. As crushed state, however, the catalyst is easily abraded to generate fine powder, thus increasing the loss.

To this point, according to the present invention, the crushed fired-gel of titanium oxide is subjected to edge-treatment to preliminarily eliminate sharp corners, thus significantly reducing the abrasion rate. As a result, the waste plastics and organics can be decomposed at high efficiency, and also the catalyst keeps its preferable shape to maintain the high catalyst efficiency over a long period of time. The effect is the same to the catalyst composed of granules of a mixture of titanium oxide. That type of edge-treatment is conducted by, for example, crushing a gel of titanium oxide or a gel mixture of the gel of titanium oxide and at least one gel of alumina and silica, which crushed product is then treated by a rolling granulation apparatus which is known as a granulator. The apparatus is, however, not limited to the rolling granulation apparatus.

The abrasion rate of the titanium oxide granules of the present invention is determined by the following method.

The determination is given by the abrasion rate tester illustrated in FIG. 1. The abrasion rate tester is composed of a sample vessel 1 having 63 mm in inner diameter and 86 mm in depth, equipped with an agitator 2. The agitator has three-piece agitation blades 4 in elliptical shape each having 20 mm in length, attached to the lower end portion of the shaft body 3 at intervals of 60° extending in the radial direction from the shaft body 3. The agitation blade inclines by 45° from the horizontal direction, while positioning the lowermost edge thereof at 8 mm above the bottom of the sample vessel.

The procedure for determining the abrasion rate of the titanium oxide granules is the following. A 150 mL of titanium oxide granules is measured by a 200 mL measuring cylinder, the weight is recorded, and then all the weighed content is charged into a sample vessel. After agitating the content by the agitator at 300 rpm for 30 minutes, all the content is taken out from the sample vessel, and is put on a sieve having 0.5 mm of opening. The sample passed the sieve is weighed. The abrasion rate A of the sample is defined as $A=(W/W_0)\times 100(\%)$, where the W is the sample weight passed the 0.5 mm opening sieve, and $W_0$ is the sample weight for the measurement.

The "catalyst composed of the titanium oxide granules" according to the present invention has the specific surface area of titanium oxide as the active ingredient of 30 $m^2/g$ or more, preferably in a range from 33 to 65 $m^2/g$, and more preferably from 35 to 50 $m^2/g$. Also, the specific surface area of titanium oxide as the active ingredient before use is preferably from 35 to 50 $m^2/g$. Larger specific surface area increases more the contact area with the waste plastics, and increases the decomposition efficiency. However, excessively large specific surface area deteriorates the heat resistance, and likely collapsing the granule to lead to powdering.

The method of determining the specific surface area of the catalyst composed of titanium oxide granules can use known methods. Among these methods, the present invention uses the BET method, which is described below in detail.

The BET method determines the specific surface area of sample by bringing molecules having a known adsorption occupying area to be adsorbed onto the surface of powder particles at liquid nitrogen temperature, and the adsorbed amount is measured to obtain the specific surface area.

The present invention adopts the specific surface area meter Model 2300 Automatic Testing Apparatus (manufactured by Shimadzu Corporation).

The "catalyst composed of titanium oxide granules" according to the present invention has the micropore volume of the titanium oxide as the active ingredient in a range from 0.05 to 0.70 cc/q, and preferably from 0.10 to 0.50 cc/g.

The method of determining the micropore volume of the catalyst composed of titanium oxide granules may be known methods. Among these methods, the present invention adopts the mercury intrusion method, which method is described below in detail.

The mercury intrusion method determines the micropore volume utilizing the large surface tension of mercury. That is, pressure is applied to intrude the mercury into micropore of the powder, and the micropore volume is determined based on the applied pressure and the intruded mercury amount.

The present invention uses a porosimeter (mercury intrusion method, maximum pressure of 200 MPa) manufactured by Thermo Finnigan.

The "catalyst composed of titanium oxide granules" according to the present invention has intensity distribution as showed by FIG. 13 and FIG. 14. The catalyst has a particle size distribution in which the percentage of particles having 1.4 mm or above is 20 to 30%, in which the percentage of particles having 1.0 to 1.4 mm is 10 to 15%, in which the percentage of particles having 0.6 to 1.0 mm is 15 to 20%, in which the percentage of particles having 0.3 to 0.6 mm is 18 to 25%, in which the percentage of particles having 0.125 to 0.3 mm is 10 to 18% when 50 KN or 70 KN is specified pressure.

Measurement of intensity distribution is as follows.

Figure 11:
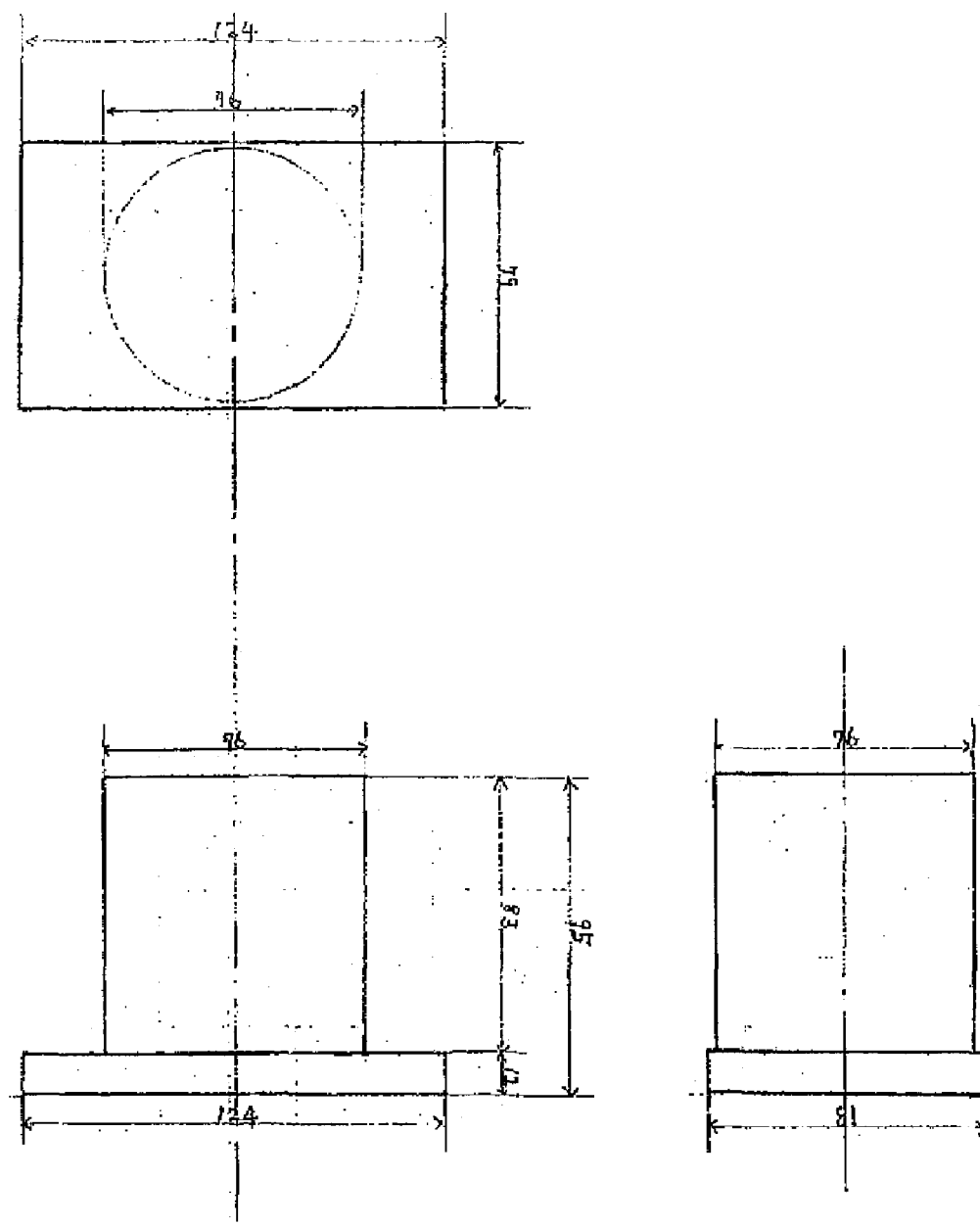
FIG. 11 shows a part of compression mold upper-presser (measure: mm).

(1) titanium oxide granules 350 g, which has been agitated, is put in mold for testing compression (produced by SAKAI CHEMICAL INDUSTRY CO., LTD, referring to FIGS. 11 and 12).
(2) The mold is placed in center of 300 KN compression tester (produced by MARUI CO., Ltd.,).
(3) The mold is charged to loading little by little. The loading is then stopped when specified pressure reaches 50 KN or 70 KN.
(4) The mold is taken out in the tester.
(5) The granules in the mold are transferred to bag and combined uniformly.
(6) The granules 25 g, which are combined uniformly, is subject to precise weighing and sieve.
(7) The granules, which remain mesh, is subject to weight measurement. And, intensity distribution of the granules is calculated based on the weight.

According to the present invention, if the amount of waste plastics and/or organics is small compared with the amount of titanium oxide granules, the waste plastics and organics are readily decomposed, and the heat for maintaining the suitable temperature for decomposition of the titanium oxide utilizing the decomposition reaction heat becomes insufficient, which requires heating from the outside, thus deteriorating the decomposition energy efficiency. If, however, the amount of waste plastics and/or organics increases compared with the amount of the titanium oxide granules, the treating materials exceeding the capacity of contact decomposition of the titanium oxide granules become non-decomposed gas, or further result in loss of activity caused by covering the surface of the titanium oxide by the organics, thereby failing in decomposing the materials.

To this point, by selecting suitable amount of the titanium oxide granules and the amount of the treating waste plastics and/or organics, the decomposition reaction heat is utilized to maintain the suitable temperature for the decomposition of titanium oxide, thus minimizing the externally supplying energy. In addition, surplus reaction heat above the suitable temperature for decomposition can be recovered and reused through the cooling-control of the reactor. For example, the heat can be recovered in a form of steam and hot water. Therefore, the recovered heat can be utilized in hot water supply to the plant facilities or in melting snow. The uses of the recovered heat are, however, not limited to those given above.

An amount to treat the waste plastics per hour is 3.0 to 40.0 kg, preferably from 6.0 to 35.0 kg, with respect to 100 kg of the titanium oxide granules of the present invention.

The optimum treating amount is obtained from the results in the following Example 3.

Further, according to the decomposition method of waste plastics and organics of the present invention, when the waste plastics to be treated are various medical waste plastics, such as polyvinylchloride, polyurethane, and Teflon, there are generated hydrogen chloride, sulfur compounds, hydrogen fluoride, cyan gas, nitrogen-containing compounds, in the treatment process. Hydrogen chloride and the like would not be emitted into atmosphere as they are. Therefore, the "lime neutralization treatment process" is introduced. The lime neutralization treatment process means a process of adsorbing to remove those to prevent them from being emitted into atmosphere.

Specifically the process uses a lime material consisting mainly of quicklime, slaked lime, or their mixture, which lime material is then molded into 2 mm or larger porous pellet of hydrogen chloride-absorber. Thus prepared pellets are packed in a removal vessel. The gases containing the aforementioned decomposed waste plastics-originated hydrogen chloride, and the like are brought to pass through the removal vessel, thus letting the hydrogen chloride, and the like react and absorb into the pellets.

The lime material according to the present invention may be quicklime, slaked lime, or a mixture of them. It is preferred that the lime material be molded to 2 mm or larger porous pellet. The method of molding the pellets is arbitrary, and simple kneading with water to dry or to fire may be applied. For examples, powder of lime material is mixed with water to a moldable hardness, which is then extruded from an extruder to cut into pellets.

The shape of the pellet is arbitrary, and spherical, disk, circular cylinder shapes may be adopted. The size of pellet is 2 mm or larger. If the size is smaller than 2 mm, the pellets become close to powder, which raises problems on apparatus caused by pressure loss of air, on emission and entrainment of powder, on filter, and the like. Although coarse pellets can be used in principle, increased size decreases efficiency. For practical applications, size of 10 mm or smaller is preferable, and an experiment given by the inventors of the present invention showed a favorable range of size from 3 to 7 mm.

Figures 2, 3:
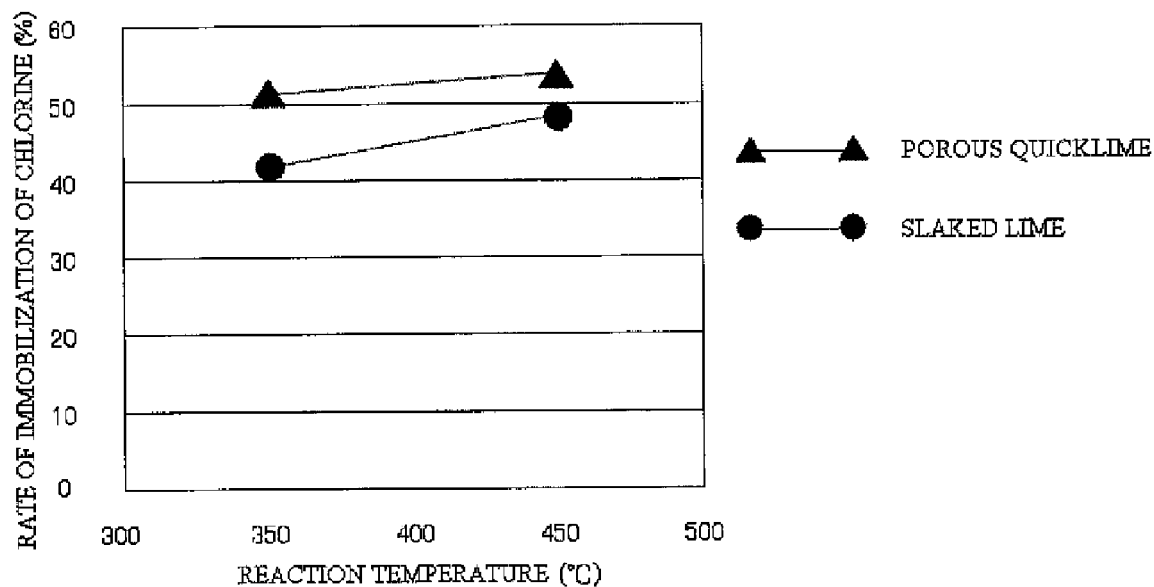
FIG. 2 shows comparison of abilities as to immobilization of chlorine.
FIG. 3 shows influences of water content in lime materials.

The lime material used in the "lime neutralization treatment process" according to the decomposition method of waste plastics of the present invention prefers to use quicklime rather than slaked lime. The finding was derived from a measurement of chlorine-fixing rate using lime materials (porous quicklime and slaked lime) given by the inventors of the present invention (referring to FIG. 2).

Further, the water content (ppm) in the lime material is preferably small to 20% or less, and more preferably 10% or less. The finding was derived from a measurement for various water contents in lime materials (slaked lime and quicklime) given by the inventors of the present invention (referring to FIG. 3).

Figure 4:
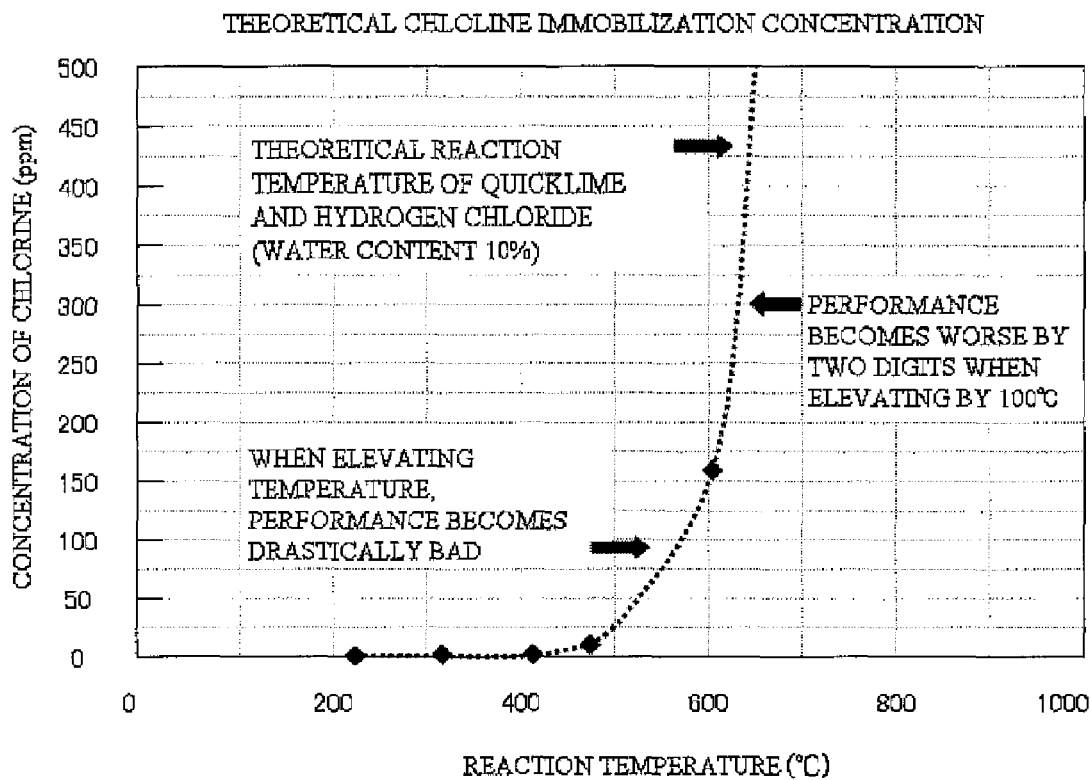
FIG. 4 shows study of heating temperature in lime neutralization treatment process.

The heating temperature in the lime neutralization treatment process is preferably 500° C. or less, more preferably 400° C. or less. The finding was derived from calculation of the theoretical chlorine-fixing concentrations (referring to FIG. 4). In the related art, the adsorption treatment of hydrogen chloride and the like is conducted at normal temperature and using slaked lime. The incineration furnace or the like in the related art conducts the adsorption treatment of hydrogen chloride and the like after decreasing the temperature of flue gas after combustion. Since the powder of slaked lime is used in the related art, the handling of slaked lime is troublesome, and the apparatus is large using bag filters with large area and in switching operation. However, the adsorption and removal treatment of the lime material according to the present invention can be done at the flue gas temperature after the decomposition reaction.

For the lime neutralization treatment process, a lime neutralization treatment apparatus is suitably employed. In the lime neutralization treatment apparatus, there is utilized a packed tank. The pellets drop from top of the packed tank toward the bottom thereof, while the gas to be treated flows from bottom to top while contacting with the lime pellets. A pellet-stock portion is located at upper portion of the packed tank, and a discharge portion for the used pellets is located at lower portion of the packed tank. The packed tank is isolated from the reaction vessel tank by a shutter, a rotary valve, or the like. The discharge rate is controlled by the treatment concentration and the treatment rate. The apparatus is provided with a heater to prevent deliquescence phenomenon. The decomposition method conducts the treatment at a high temperature so that no deliquescence phenomenon appears. Nevertheless, a heater process is preferably applied to respond to the non-heating state.

An "oxidation catalyst treatment process" may be introduced into the decomposition method of waste plastics and organics according to the present invention. The oxidation catalyst treatment process is conducted, because the waste plastics and organics decomposed by the heated titanium oxide catalyst have a possibility of being not-perfectly decomposed, and that the non-reacting matter and intermediate products may leave the reactor. Thus, according to the present invention, the succeeding oxidation catalyst treatment process is preferably conducted for further oxidation or decomposition. The oxidation catalyst treatment process is preferably given after the lime neutralization treatment process.

The oxidation catalyst is the one which generally initiates oxidation and decomposition reactions at lower temperature and shorter time than those in the case of non-catalytic reactions. There are varieties of known oxidation catalysts of that type, and they are commercially available. Generally the reaction temperature is in a range from 200° C. to 500° C. According to the present invention, however, 300° C. or above, and preferably 350° C. or above, is adopted. That is because, for the case of decomposition of varieties of waste plastics and organics, the generated non-decomposed gas is not necessarily a single substance. Therefore, 350° C. or higher temperature is preferred to completely decompose mixed non-decomposed gases. From the point of efficiency and of effectiveness of apparatus, the present invention prefers a honeycomb type catalyst.

Platinum catalyst is suitable for a reaction converting carbon monoxide to carbon dioxide, and for decomposition of lower hydrocarbons and VOCs (volatile organic compounds).

Palladium catalyst is suitable for methane gas decomposition. As of these catalysts, palladium and platinum catalysts are preferred in the present invention. The treatment order of application of them is preferably palladium catalyst followed by platinum catalyst.

It is preferable to conduct a pre-heating treatment (previous heat retention) before the catalyst treatment, in order to treat the oxidation catalyst steadily when a gas having a low concentration flows into, or the heat generation at the decomposition tank is low.

The oxidation catalyst affects considerably the oxidation of non-combustion substances such as carbon monoxide and hydrocarbons. With oxygen and at a certain temperature, almost all the substances are immediately oxidized to decompose. Carbon monoxide becomes carbon dioxide, and hydrocarbons become carbon dioxide and water.

Figure 5:
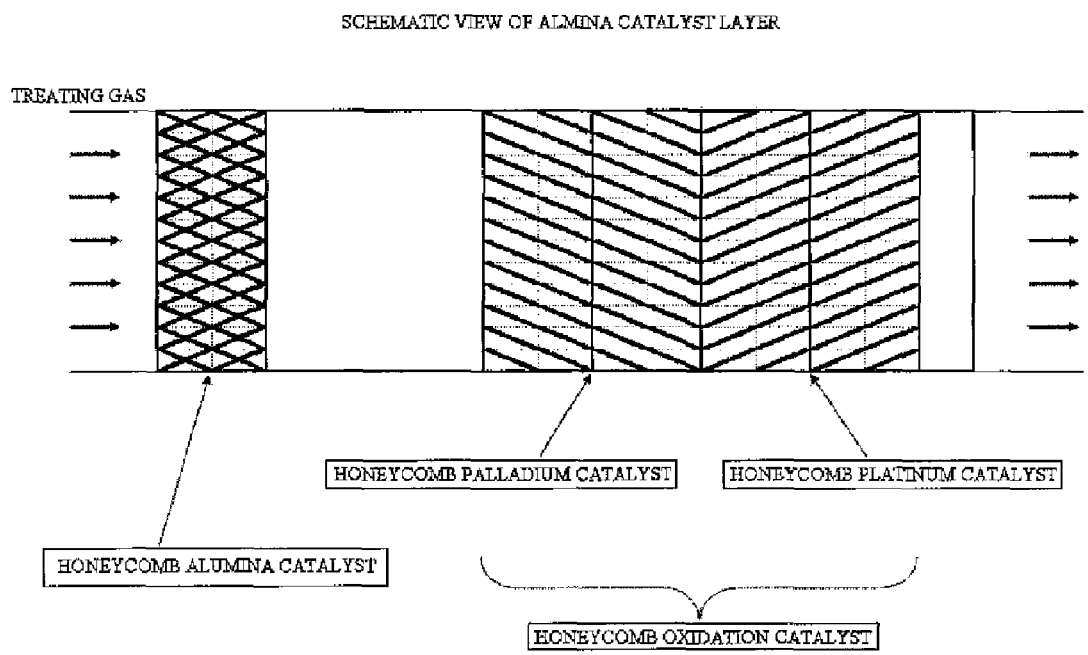
FIG. 5 illustrates a schematic view of an alumina catalyst tank.

Further, the method of decomposing waste plastics according to the present invention preferably adopts the "alumina catalyst treatment process" before the oxidation catalyst treatment process. The alumina catalyst treatment process prevents adhesion of Si, Mg, Cr, Pb, Fe, and the like, or dust or the like to the oxidation catalyst. The alumina catalyst is preferably positioned before the oxidation catalyst tank. An alumina catalyst tank may be installed separately (referring to FIG. 5). The heating temperature of alumina catalyst is preferably 350° C. or above.

As described above, the present invention can combine: the oxidation and decomposition by titanium oxide; the removal of hydrogen chloride, hydrogen fluoride, sulfur compounds, nitrogen-containing compounds, and the like using the lime neutralization treatment; removal of dust and the like by the alumina catalyst treatment; and/or further oxidation and decomposition by an oxidation catalyst.

Figure 6:
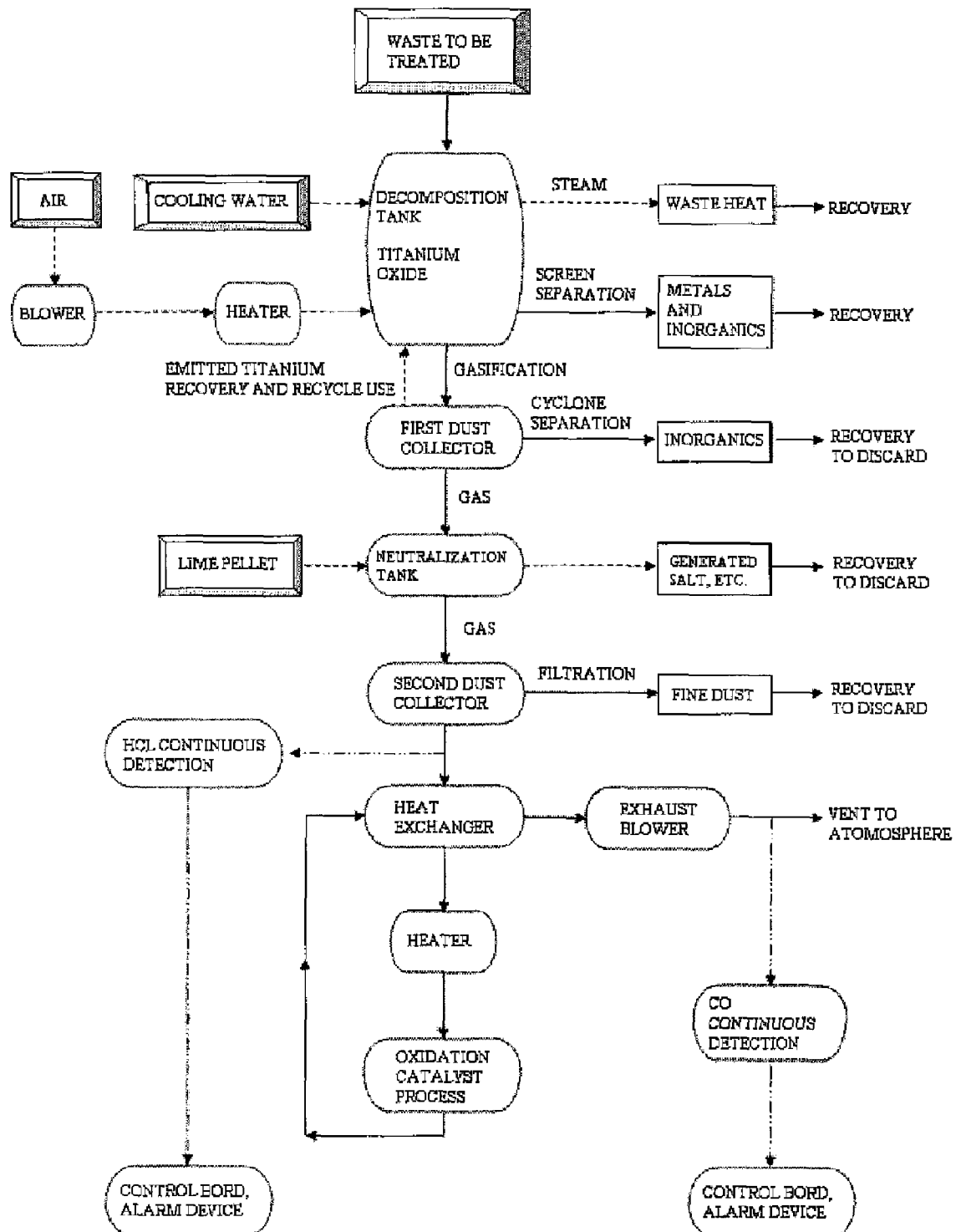
FIG. 6 illustrates a flow of the decomposition method of waste plastics according to the present invention.

The flow of decomposition method for waste plastics and organics according to the present invention is illustrated in FIG. 6. As given in FIG. 6, the decomposition method of the present invention can contain, adding to the above-described processes, the air-supply process, the cooling process using cooling water, the emitted titanium oxide recovery and reuse process using cyclone separator, the heat exchange process using heat exchanger, the dust collection process to remove fine powder, the exhaust gas process using exhaust blower, the exhaust gas safe control process using hydrogen chloride detector, and the exhaust gas safe control process using CO detector.

Furthermore, the decomposition method for waste plastics and organics according to the present invention may adopt the "process of separating metals and/or inorganics." The waste plastics and decomposed materials which are oxidized or decomposed by the above heated catalyst may contain metals such as stainless steel, iron, aluminum, and copper, and inorganics, and may have vapor-deposited or adhered metals on the surface thereof. Those kinds of metals are not decomposed, different from the waste plastics and organics, and enter the catalyst to accumulate in the reactor. Therefore, the process of separating metals and/or inorganics separates and recovers the metals from the catalyst. Not only the waste, there are many materials in which the plastics or organics are integrated with metals and inorganics. The present invention is able to decompose only the plastics or organics in the materials integrated with metals and inorganics, thus taking out the metals and inorganics.

For the method of separating metals and/or inorganics, for example, a sieve having an opening to allow the granular titanium oxide catalyst of largest size to pass through is located in the reactor. When only the metals and inorganics caught by the wire mesh are taken out, the metals and inorganics left in the reactor become minimum volume. Alternatively, the catalyst and the metals and inorganics may be separated from each other by the difference in the specific gravity. Metals such as aluminum thin foil which have smaller specific gravities than that of catalyst float above the catalyst during the process of agitating the titanium oxide catalyst, thus they are selectively recovered. If the recovering metal is a magnetic one, magnetism or magnetic field may be used to separate the metal from the catalyst. The method of separating metals from catalyst is not limited to above described ones.

The agitation of the catalyst composed of the titanium oxide granules and the waste plastics is conducted at a rotation speed of 5 rpm to 70 rpm, preferably 10 rpm to 40 rpm, depending on differences of a volume of the reactor, the shape of the agitation blade and the agitation method. It is preferable to employ the same rotation speed even if the reactor is for batch type or circulation type.

This value is determined by considering the fact that abrasion of the titanium oxide become large when the rotation speed is too high, and that contact efficiency of the titanium oxide and waste plastics and/or organics is lowered when the rotation speed is low.

In other words, it is preferable to apply a load at 0.75 kW to 1.5 kW to 100 kg of the titanium amount while regulating an inverter at 30 Hz to 70 Hz.

The carrier gas supplied to the reactor is preferably oxygen. Normally, however, air is applied. Alternatively, an inert gas may be applied as needed. The method of supplying the carrier gas preferably supplies the carrier gas distributing uniformly into the titanium oxide granules. The supply amount is preferably 1.3 to 4.0 times the theoretically required oxygen amount using air at normal temperature, containing oxygen by an amount necessary for oxidation and decomposition of the decomposing organics. From the point of decomposition efficiency, 1.6 to 3.0 times thereof is preferred. For example, there is a method of supplying oxygen and the like from a numerous small holes provided on the bottom of the reactor.

The waste plastics and organics applicable to the decomposition method according to the present invention are not specifically limited, and, adding to the general-purpose thermoplastic plastics such as polyethylene and polypropylene, the thermosetting plastics can be decomposed and gasified by the method of the present invention. Although the waste plastics and organics are preferably crushed to several millimeters square, in view of decomposition efficiency, they are also able to be decomposed without crushing.

The materials which can be decomposed by the decomposition system for waste plastics and organics according to the present invention include but are not specifically limited to organics, and examples of these applicable materials are: plastics including polyethylene, polypropylene, polyester, polyethyleneterephthalate, polystyrene, polycarbonate, polyurethane, polyvinylchloride, Teflon; diaper; artificial dialyzer; anticancer drugs; treated articles relating to gene research; information-relating device terminals; confidential information-relating devices (such as CD-R); waste plastics generated from automobiles and household electric appliances; valuable metal recovery; and separation of organics from metals and inorganics. For the case of medical waste, there are often existing metals such as stainless steel and aluminum depending on the uses, or existing vapor-deposited or adhered metals on the surface thereof. The waste plastics are not limited to the used plastics but also include non-used but unnecessary plastics and organics.

The present invention will be described in the following by referring to examples, but the present invention is not limited to those examples.

Example 1

Study of Heating Temperature

The optimum heating temperature for the catalyst composed of the titanium oxide granules and the waste plastics was studied. Conditions are as follows:
1. Experimental device (reactor): Agitation type decomposition experimental machine (2200 mL)
2. Air flow to be introduced: 50 L/min
3. Inside temperature of reactor: 300° C., 320° C., 350° C., 380° C., 400° C., 420° C., 450° C., 480° C., 500° C., 530° C., 550° C., 560° C., 570° C., 580° C., 600° C.
4. Used catalyst: 700 g of titanium oxide catalyst (SSP-G Lot. 051108 available from SAKAI CHEMICAL INDUSTRY Co., Ltd.)
5. Waste plastics: Polyethylene pellets 1 g/one charge For measurement of a gas concentration ($NO_x$, CO, $CO_2$, $O_2$, $CH_4$), a gas concentration continuous measuring device PG-250 (manufacture: HORIBA, Ltd.) was used.

The waste plastic was decomposition-treated at the above temperature. The results are shown in FIG. 7.

The waste plastic was not able to decomposed at a heating temperature of 300° C. This is because, when a heating temperature is 300° C. or less, the titanium oxide has no activity and no decomposition ability functions, the waste plastic was merely melted at a temperature of 300° C. and almost all thereof adhered and was deposited on the surface of the titanium oxide. When heating at 300° C. continuously, the surface of the titanium oxide was covered with the organics derived from the waste plastics to make the catalytic activity of the titanium oxide lost.

At a heating temperature of 350° C., though the reaction was slightly occurred, the result was the same as that at 300° C.

At a heating temperature of 600° C., the waste plastic was burnt out at the same time when charged into the reactor. That is, at a heating temperature of 600° C. or more, the waste plastic ignited at the instant when charged. This is not decomposition of the waste plastic by catalytic action of the titanium oxide, and a large amount of un-decomposed gases were generated due to burning.

At heating temperatures of 570° C. and 580° C., the waste plastic ignited and was burnt out after 5 to 15 seconds from charge.

At a heating temperature of 350° C., 35 to 45 minutes was required for one decomposition.

At a heating temperature of 380° C., 15 to 25 minutes was required for one decomposition.

At a heating temperature of 400° C., 6 to 8 minutes was required for one decomposition.

At a heating temperature of 420° C., 3 to 5 minutes was required for one decomposition.

At a heating temperature of 450° C., 1 minute and 30 seconds to 2 minutes was required for one decomposition.

At a heating temperature of 480° C., 30 to 40 seconds was required for one decomposition.

At a heating temperature of 500° C., 30 seconds was required for one decomposition.

At a heating temperature of 530° C., 25 seconds was required for one decomposition.

At a heating temperature of 550° C., 20 seconds was required for one decomposition.

At a heating temperature of 560° C., 20 seconds was required for one decomposition.

At heating temperatures of 350° C. to 420° C., since the decomposition proceeded slowly, the decomposition was not efficient and was not practical. From 450° C. to 560° C., good decomposition of the waste plastic was observed. Further, most efficient decomposition of the waste plastic was observed at a heating temperature of 480° C. from viewpoints of decomposition efficiency, reaction stability, safety due to variation range of reaction temperature, and the like.

As the results thereof, it has been found that the optimum heating temperature was in a quite narrower range than the heating temperature known in the prior arts, and a highly efficient decomposition reaction was achieved only in that range. The practical application also corresponded to that range. When experiments were conducted by changing an amount of oxygen supply, though the decomposition rate changed, the optimum heating temperature did not change.

Example 2

Determination of Dioxin Generated During the Processes of the Decomposition Method According to the Present Invention An amount of dioxin generated during the processes of the decomposition method according to the present invention was determined. The used plastic was a waste plastic containing 20% polyvinylchloride that generates a large amount of dioxin and hydrogen chloride by burning.

The measuring conditions were as follows:
1. Decomposition apparatus: 100 kg titanium oxide agitation type decomposition apparatus
2. Used catalyst: 100 kg of titanium oxide catalyst (SSP-G Lot. 050323 available from SAKAI CHEMICAL INDUSTRY Co., Ltd.)
3. Kind and amount of used plastic: Mixture of polyvinylchloride and polyethylene (20:80% by weight), 117 g/min
4. Heating temperature of titanium oxide granules: 480° C.
5. Air flow to be introduced: 3.9 $m^3$/min
6. Lime neutralization treatment process
7. Oxidation catalyst treatment process The concentration of the gases was measured by the particular research organization.

The results of determining amounts of dioxin generated during the processes of the decomposition method according to the present invention are shown in FIG. 8. The measured values of concentrations of dioxins and coplanar PCB in any of flue gas (after oxidation catalyst treatment), titanium oxide granules in the decomposition tank (catalyst in decomposition tank), lime substance after the lime neutralization treatment process (neutralizing agent in the neutralization apparatus) were low, and further, a toxicity equivalent was very small. The results revealed that the amount of dioxin generated during the processes of the decomposition method according to the present invention was lower than the legal control value.

Generally, when burning out the material containing 20% vinyl chloride, large amount of dioxin and hydrogen chloride is generated, and thus treatment has been difficult. Also, by using a usual incinerator, generation of dioxin occurs at the initial time depending on the condition of charged substance, and an incinerator ash containing a large amount of dioxin remains. When carrying out at a high temperature treatment, it is hard to maintain because large heat energy is required and the incinerator deteriorates seriously. The present invention, however, makes it possible to conduct the treatment at a lower temperature and to maintain the incinerator easier in comparison to the prior incinerator, and moreover, any dioxin that is legally controlled is not generated. Therefore, the decomposition method according to the present invention is a ground-breaking decomposition method, because no organic residue remains even though the decomposition is conducted at a low temperature.

Example 3

Study of Specific Surface Area of Catalyst Composed of Titanium Oxide Granules

The optimum specific surface area of catalyst composed of titanium oxide granules was studied.
Conditions are as follows:
1. Experimental device (reactor): Agitation type decomposition experimental machine
2. Heating method: Air-introducing heating system
3. Air flow to be introduced: 50 L/min
4. Inside temperature of reactor: 480° C.
5. Agitation speed: 35 rpm
6. Used catalyst: 700 g of titanium oxide catalyst (SSP-G Lot. 051108 available from SAKAI CHEMICAL INDUSTRY Co., Ltd.)
7. Waste plastic: Polyethylene 1 g/min charge
8. Specific surface area of catalyst composed of titanium oxide granules: 30 $m^2/g$, 40 $m^2/g$, 70 $m^2/g$ (1) Titanium oxide granules having specific surface area of 30 $m^2/g$ and a micropore volume of 0.20 cc/g The polyethylene of waste plastic was charged to the titanium oxide granules in the reactor. Just after the charge, the waste plastic was turned black as a lump, and then the lump was broken into a powder form. The waste plastic in the form of powder was spread all over the catalyst and the whole of the catalyst was turned black. The catalyst turned black changed in its color to the original color gradually, and was returned to the original color in about 40 to about 60 seconds. When the lump was broken to be spread just after the charge of the waste plastic, a smoke was observed slightly. Efficiency was bad because of long decomposition time.

(2) Titanium oxide granules having specific surface area of 40 $m^2/g$ and a micropore volume of 0.23 cc/g The polyethylene of waste plastic was charged to the titanium oxide granules in the reactor. Just after the charge, the waste plastic was turned black as a lump, and then the lump was broken into a powder form. The waste plastic in the form of powder was spread all over the catalyst and the whole of the catalyst was turned black. The catalyst turned black changed in its color to the original color gradually, and was returned to the original color in about 30 to about 40 seconds. Decomposition efficiency was good.

(3) Titanium oxide granules having specific surface area of 70 $m^2/g$ and a micropore volume of 0.26 cc/g The polyethylene of waste plastic was charged to the titanium oxide granules in the reactor. Just after the charge, the waste plastic was turned black as a lump, and then the lump was broken into a powder form. The waste plastic in the form of powder was spread all over the catalyst and the whole of the catalyst was turned black. The catalyst turned black changed in its color to the original color gradually, and was returned to the original color in about 30 to about 45 seconds. Breaking up and spreading of the lump prepared just after the charge of the waste plastic occurred slowly. In addition, handling was bad because the titanium oxide itself was broken up into a powder form and spread.

From the above results, the waste plastic was decomposed sufficiently when the specific surface area was not less than 30 $m^2/g$. The waste plastic was, however, decomposed more efficiently when the specific surface area was not less than 35 $m^2/g$. When the specific surface area is made too large, the heat resistance was low and the granules were broken up to a powder form.

Therefore, it has been found that the titanium oxide granules having a specific surface area from 33 $m^2/g$ to 65 $m^2/g$, more preferably from 35 $m^2/g$ to 50 $m^2/g$ can decompose the waste plastic at a high efficiency.

Example 4

Study of the Optimum Treating Amount by Catalyst Composed of Titanium Oxide Granules The optimum treating amount by catalyst composed of titanium oxide granules was studied.

A maximum amount being able to be treated was calculated by gradually increasing a treating amount of polystyrene pellets. The treatments were conducted by using 350 g titanium oxide catalyst at 1 g/min, 2 g/min×5 times, 2 g/min×5 times continuous feed, 3 g/min continuous feed, 4 g/min continuous feed, 5 g/min continuous feed.

In the case of 4 g/min continuous feed, vigorous ignition and burning were happened. Because turning black of the catalyst was extremely increased even in the case of 3 g/min, it has been decided that a maximum amount being able to be treated is 2 g/min continuous feed.

From the above experiments, a weight ratio of the maximum amount of waste plastic being able to be treated with respect to the used amount of the catalyst is 100:34.2.

From the results, as a maximum amount being able to be treated, it has been found that an optimum amount to treat the waste plastic per hour with respect to 100 kg of the titanium oxide granules according to the present invention is 3.0 kg to 40.0 kg, preferably 6.0 kg to 35.0 kg.

Example 5

Decomposition of Polyethylene and Polystyrene

The aforementioned each waste plastic was decomposed by using the titanium oxide granules (SSF-G Lot. 051108, available from SAKAI CHEMICAL INDUSTRY Co., Ltd.) heated at 480° C. Details are as follows.

As a decomposition apparatus, a cylindrical vessel and a heating device controlled by heated air were used. The vessel was charged with 700 g of titanium oxide. Subsequently polyethylene pulverized to particles was fed by 0.6 g/30 sec each and agitated at 35 rpm with an agitator. All of the exhaust gas at a flow rate of 100 L/min was recovered. Substances contained in the exhaust gas were determined with time.

For measurement of a gas concentration, a gas concentration continuous measuring device PG-250 (manufacture: HORIBA, Ltd.) was used.

After 30 seconds from the feed of polyethylene, exhaustion of carbon dioxide gas and CO were observed in the exhaust gas. After that, the concentrations were returned to a normal state. Synchronizing with that, the fed polyethylene was turned black as a lump, and then the lump was broken into a powder form. The waste plastic in the form of powder was spread all over the catalyst and the whole of the catalyst was turned black. The catalyst turned black returned to the original color gradually. The waste plastic was decomposed after 30 seconds without smoking. Separately, when using inactive titanium oxide granules having the same particle size as a control, the polyethylene was burned with black smoke as the case of usual burning. These results show that the decomposition with titanium oxide is not burning, but is catalytic decomposition. The same results were obtained with respect to polystyrene.

From the above results, similar to the results in Example 1, according to the decomposition method of waste plastics of the present invention, when the heating temperature of the catalyst composed of titanium oxide granules and the waste plastic was set at about 480° C., polyethylene and polystyrene were decomposed at a high efficiency.

Example 6

Decomposition of Polyvinylchloride, Polyurethane, and Teflon

Polyvinylchloride contains chlorine atoms in its molecule, polyurethane contains nitrogen atoms in its molecule, and Teflon contains fluorine atoms in its molecule. By using the decomposition method according to the present invention, research has been done as to whether or not the plastics generating those harmful gases in decomposition processes could be decomposed, and further whether or not those gases could be removed by adsorption.

Namely, after the titanium oxide treatment process, the lime neutralization treatment process, and further the oxidation catalyst treatment process with platinum were conducted. By recovering the gases after each process, ingredients contained in the gases were determined. The same determination was conducted with respect to polyethylene and polystyrene.

The measuring conditions were as follows:
1. Decomposition apparatus: 100 kg titanium oxide agitation type decomposition apparatus
2. Used catalyst: 100 kg of titanium oxide catalyst (SSP-G Lot. 060829 available from SAKAI CHEMICAL INDUSTRY Co., Ltd.)
3. Kind and amount of used plastic: polyvinylchloride (70 g/min), polyurethane (120 g/min), Teflon (30 g/min), polyethylene (100 g/min), polystyrene (100 g/min)
4. Heating temperature: 480° C. (polyethylene, polystyrene, polyvinylchloride), or 490° C. (polyurethane, Teflon.)
5. Lime neutralization treatment process
6. Palladium platinum oxidation catalyst treatment process The concentration of the gases was measured by the particular research organization.

The results of determined gases generated by the decomposition of each waste plastic are shown in FIG. 9.

With respect to the decomposition of polyvinylchloride, after the lime neutralization treatment process, HCl and chlorine were removed to an extent having no environmental problem. With respect to the decomposition of polyurethane, $NO$, $NO_2$ and HCN were removed sufficiently. With respect to the decomposition of Teflon, after the lime neutralization treatment process, hydrogen fluoride was removed to an extent having no environmental problem.

With respect to every waste plastic, VOC (volatile organic compound) and lower hydrocarbons were removed sufficiently.

The above results show that, though it is difficult to decompose Teflon and the like which generate a harmful gas, particularly hydrogen fluoride by the prior incinerator, according to the decomposition method of the present invention, Teflon and the like can be decomposed at a high efficiency and further the harmful gases can be treated safely without exhausting out of the apparatus.

Example 7

Study of Decomposition of Medical Wastes

In the aforementioned examples, it was confirmed that waste plastic could be decomposed sufficiently. In this example, it was checked whether or not medical wastes (centrifugal tube, blue chip, swine blood, infusion set, neo-tube, syringe, cell scraber, Sure-Fuser, sure flow, dialyser, latex rubber, chip, kimtowel) could be decomposed.

The measuring conditions were as follows:
1. Decomposition apparatus: circulation type testing machine (volume: 385 L)
2. Used catalyst: 200 kg of titanium oxide catalyst (approach pass 100 kg, return pass 100 kg, SSP-G Lot. 060116 available from SAKAI CHEMICAL INDUSTRY Co., Ltd.)
3. Heating temperature: 480° C.
4. Rotation speed of agitation: approach pass (decomposition part) 10 rpm, return pass 35 rpm
5. Temperature of oxidation catalyst: 400° C.
6. Air flow rate: 2.75 $m^3$/min
(1) Treated medical wastes (total 3.45 kg): 2 kg of 36 plastic petri dishes (large), 0.25 kg of 10 petri dishes (small), 0.4 kg of 30 centrifugal tubes (50 ml), 0.2 kg of blue chip, 0.6 kg of a corrugated box for medical wastes were crushed.

In each case of feed at 84 g/min or feed at 120 g/min, the wastes could be decomposed within 30 minutes.
(2) Treated medical wastes (total 7.007 kg): After 4 kg of 72 plastic petri dishes (large), 0.5 kg of 20 petri dishes (small), 0.8 kg of 60 centrifugal tubes (50 ml), 0.4 kg of blue chip, 0.6 kg of a corrugated box for medical wastes were crushed, 707 g of swine blood (including washing water, water-absorbable polymer) was admixed.

In case of feed at 120 g/min, the wastes could be decomposed stably.
(3) Treated medical wastes (total 7.185 kg): 2.6 kg of two sets of 50 infusion sets, 1.63 kg of two sets of 100 neo-tubes (vacuum collecting tube), 1.97 kg of two sets of syringe (20 ml), 385 g of one bag of cell scraber, 0.6 kg of a corrugated box for medical wastes were crushed.

In case of feed at 156 g/min for 40 minutes, 7280 g of the wastes could be decomposed.
(4) Treated medical wastes (total 6.703 kg): 773 g of swine blood (including washing water, water-absorbable polymer) was admixed to 5.93 kg of the same wastes as that of the aforementioned (3).

In case of feed at 120 g/min, the wastes could be decomposed stably.
(5) Treated medical wastes (total 3.055 kg): 765 g of one set of 5 Sure-Fusers, 340 g of 20 syringes, 620 g of 2 sure flows, 670 g of 6 dialysers (excluding aluminum laminate), 660 g of a corrugated box were crushed.

The wastes could be decomposed at feed at 63 g/min or 84 g/min.
(6) Treated medical wastes (total 3.82 kg): 720 g of swine blood (including washing water, water-absorbable polymer) was admixed to 3.1 kg of the same wastes as that of the aforementioned (5).

All of the wastes could be decomposed at feed at 85 g/min for 45 minutes.
(7) Treated industrial wastes (total 4.755 kg): 2.2 kg of three sets of latex rubber glove, 400 g of chips, 945 g of two sets of kimtowel, 560 g of syringes, 650 g of a corrugated box were crushed.

All of the wastes could be decomposed at feed at 480 g/min for 10 minutes.
(8) Treated medical wastes (total 5.37 kg): 670 g of swine blood (including washing water, water-absorbable polymer) was admixed to 4.7 kg of the same wastes as that of the aforementioned (7).

1540 g of the wastes could be decomposed at feed at 77 g/min for 20 minutes. Further, 3840 g of the wastes could be decomposed at feed at 96 g/min for 40 minutes.

From the above results of (1) to (8), the medical wastes could be decomposed. Particularly, according to the decomposition method of the present invention, it has been confirmed that the nitrogen compounds such as NOx could be treated safely in the decomposition of wastes such as blood derived from living body, and the sulfur compounds such as hydrogen sulfide and hydrogen sulfurous acid gas could be treated safely by the lime neutralization treatment process.

Example 8

Check of Fungus Adhered to Titanium Oxide Granules

After decomposition treatment of a petri dish in which a fungus was incubated, whether or not the fungus was adhered to titanium oxide granules after the decomposition treatment was checked. In detail, in an agitation type experimental machine and a determination machine, titanium oxide granules were recovered after treating *E. coli* and other organics, and bacteria contained therein were checked. Experimental method is in the followings.
(1) In the agitation type experimental machine, about 260 g of used titanium oxide was washed by adding 200 ml of distilled water. A part of the washed water was added to SCD medium and various media, and incubated at 35° C. for 24 hours and 48 hours. After incubation, thus formed colonies were observed and counted.
(2) In the determination machine, when exchanging titanium oxide, about 50 g of titanium oxide was collected, 35 ml of a phosphate buffer was added, and then buffer was recovered as washed water after sufficient agitation. A part of the washed water was added to SCD medium and various Petan check media, and incubated at 35° C. for 24 hours and 48 hours. After incubation, thus formed colonies were observed and counted.

The results of the aforementioned (1) and (2) are shown in FIG. 10. In each case, none of *E. coli* and the like was detected in the washed waters obtained from the titanium oxide granules after the decomposition treatment of waste plastics.

From the above, according to the decomposition treatment process of the present invention, *E. coli* was deadened.

What is claimed is:

1. A decomposition method of waste plastics and organics by gasifying the waste plastics and/or organics, the method comprising a process of heating and agitating the waste plastics and/or organics together with a catalyst composed of titanium oxide granules in which the active ingredient is titanium oxide, wherein the heating temperature of the catalyst is within the range of 420° C. to 560° C., wherein the titanium oxide granules have the following characteristics:
   (1) a specific surface area from 33 to 65 m$^2$/g; and
   (2) a granule size before being used of 3.5 mesh (5.60 mm) or smaller, and wherein 90% by weight or more of said titanium oxide granules have a size of 0.1 mm to 5.60 mm.

2. The decomposition method according to claim 1, wherein for every 100 kg of titanium oxide granules being used, 3.0 to 40 kg of waste plastics per hour is added.

3. The decomposition method according to claim 1, further comprising a lime neutralization treatment process.

4. The decomposition method according to claim 1, further comprising an oxidation catalyst treatment process.

5. The decomposition method according to claim 4, further comprising an alumina catalyst treatment process before the oxidation catalyst treatment process.

6. The decomposition method according to claim 1, further comprising the process of separation of metals and/or inorganics.

7. The decomposition method of claim 1, wherein said specific surface area is from 35 m$^2$/g to 50 m$^2$/g.

* * * * *